US008224718B1

(12) United States Patent
Sholtis et al.

(10) Patent No.: US 8,224,718 B1
(45) Date of Patent: Jul. 17, 2012

(54) METHOD AND SYSTEM FOR MANAGING INVENTORY INFORMATION USING A MOBILE DEVICE

(75) Inventors: Steven A. Sholtis, El Dorado Hills, CA (US); Terry F. LeClair, Fremont, CA (US); Richard W. Ihrie, Woodside, CA (US); James R. Del Favero, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 618 days.

(21) Appl. No.: 11/495,858

(22) Filed: Jul. 28, 2006

(51) Int. Cl.
*G06Q 10/00* (2012.01)
*G06K 7/10* (2006.01)
(52) U.S. Cl. ............... 705/28; 235/462.45; 235/472.01
(58) Field of Classification Search ............... 705/22, 705/23, 28, 29, 20, 21
See application file for complete search history.

(56) References Cited

U.S. PATENT DOCUMENTS

| | | | | |
|---|---|---|---|---|
| 6,681,989 B2* | 1/2004 | Bodin | ............... | 235/383 |
| 7,113,922 B2* | 9/2006 | Fowler | ............... | 705/28 |
| 7,239,346 B1* | 7/2007 | Priddy | ............... | 348/220.1 |
| 2002/0065728 A1* | 5/2002 | Ogasawara | ............... | 705/23 |
| 2002/0077937 A1* | 6/2002 | Lyons et al. | ............... | 705/28 |
| 2002/0091593 A1* | 7/2002 | Fowler | ............... | 705/28 |
| 2002/0188561 A1* | 12/2002 | Schultz | ............... | 705/40 |
| 2003/0023493 A1* | 1/2003 | Ohashi et al. | ............... | 705/16 |
| 2003/0144926 A1* | 7/2003 | Bodin et al. | ............... | 705/28 |
| 2003/0158796 A1* | 8/2003 | Balent | ............... | 705/28 |
| 2005/0149414 A1* | 7/2005 | Schrodt et al. | ............... | 705/29 |
| 2006/0095331 A1* | 5/2006 | O'Malley et al. | ............... | 705/22 |
| 2007/0239569 A1* | 10/2007 | Lucas et al. | ............... | 705/28 |

* cited by examiner

*Primary Examiner* — Ryan Zeender
*Assistant Examiner* — H Rojas
(74) *Attorney, Agent, or Firm* — Osha • Liang LLP

(57) ABSTRACT

A method for managing inventory information that includes displaying the inventory information in a graphical user interface of a mobile device, and adding an item as part of the inventory information, using the mobile device, where adding the item includes adding descriptive metadata about the item to the inventory information.

9 Claims, 5 Drawing Sheets

METHOD AND SYSTEM FOR MANAGING INVENTORY INFORMATION USING A MOBILE DEVICE

BACKGROUND

Many different scenarios exist in which one may wish to maintain an inventory of physical items. For example, a warehouse operator may wish to track stocked items, a retail store owner may wish to track retail inventory, an individual may wish to track household belongings, etc. In such cases, systems used to maintain inventories are often fairly basic. For example, a user-programmed spreadsheet maintained on a desktop computer may be used, or perhaps simply a paper logbook.

SUMMARY

In general, in one aspect, the invention relates to a method for managing inventory information. The method comprises displaying the inventory information in a graphical user interface of a mobile device, and adding an item as part of the inventory information, using the mobile device, wherein adding the item comprises adding descriptive metadata about the item to the inventory information.

In general, in one aspect, the invention relates to a system. The system comprises a plurality of items stored as inventory information, and a mobile inventory application for a mobile device, configured to display inventory information about at least one of the plurality of items in a graphical user interface of the mobile device, and add an item as part of the plurality of items, wherein adding the item comprises adding descriptive metadata about the item as part of the inventory information.

In general, in one aspect, the invention relates to a graphical user interface displaying a mobile inventory interface. The graphical user interface comprises descriptive metadata associated with an item stored as inventory information, wherein the mobile inventory interface is used to add the item as part of the inventory information, and a metadata entry field, wherein the item is added by entering the descriptive metadata into the metadata entry field.

In general, in one aspect, the invention relates to a computer readable medium. The computer readable medium comprises executable instructions for managing inventory information by displaying the inventory information in a graphical user interface of a mobile device, and adding an item as part of the inventory information, using the mobile device, wherein adding the item comprises adding descriptive metadata about the item to the inventory.

Other aspects of the invention will be apparent from the following description and the appended claims.

DETAILED DESCRIPTION

Figure 1:
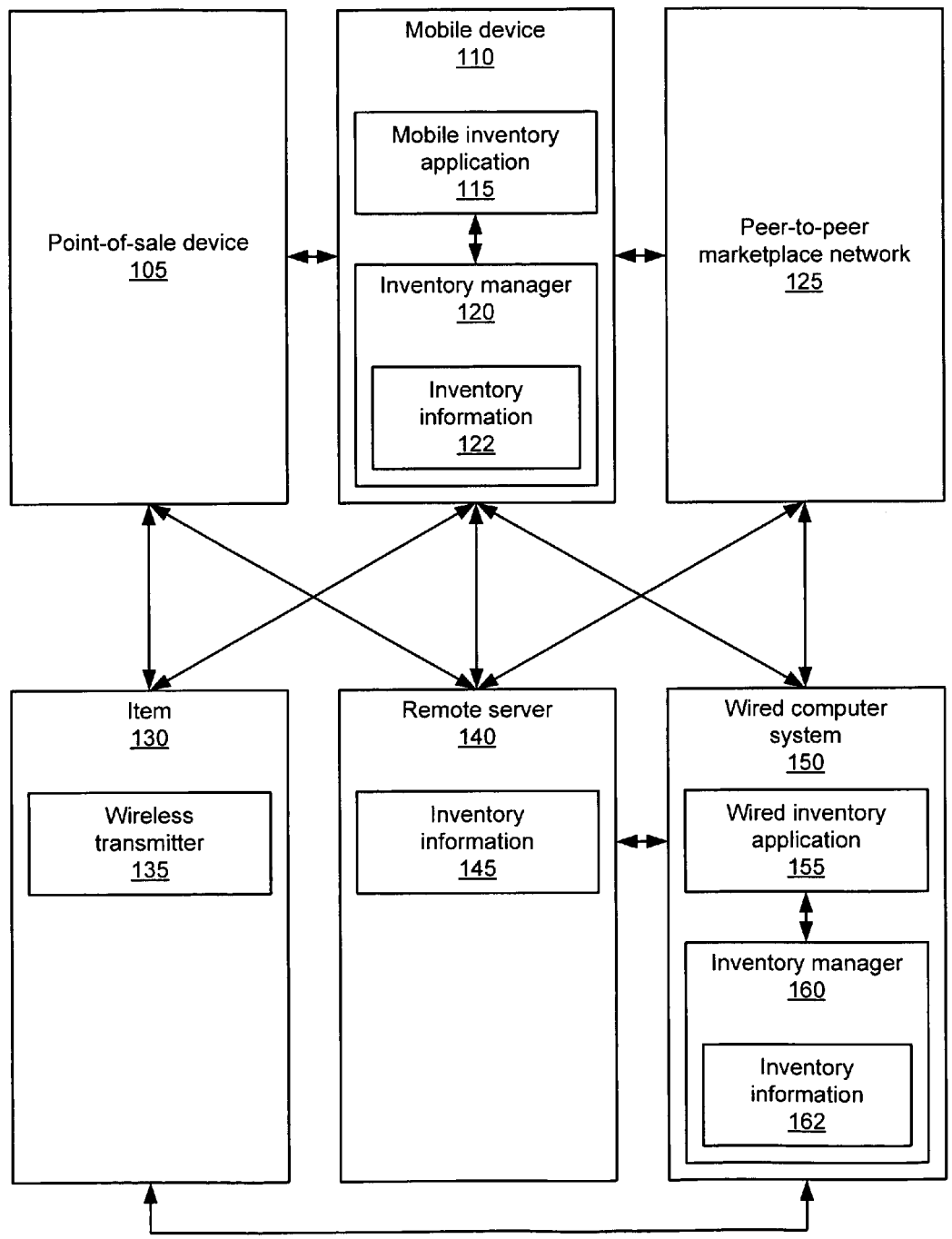
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to maintain and display inventory information in a graphical user interface of a mobile device. Specifically, the mobile device is used to add an item as part of the inventory information.

In the following discussions of FIGS. 1-5, reference is made to descriptive metadata associated with items. In one or more embodiments of the invention, descriptive metadata may include a name of an item, a description of the item, an image associated with the item, a model name of the item, a serial number of the item, a location of the item, a category of the item, a purchase price of the item, a date when the item was obtained, a location where the item was obtained, a resale value of the item, a physical condition of the item, warranty information associated with the item, insurance information associated with the item, a status of the item, a supplemental note associated with the item, any other similar type of metadata, or any combination thereof.

FIG. 1 shows a diagram of a system in accordance with one or more embodiments of the invention. Specifically, in one or more embodiments of the invention, the system includes a mobile device (110). For example, the mobile device (110) may be a cellular phone, a personal digital assistant (PDA), a mobile media device, or any other similar type of device. In one or more embodiments of the invention, a mobile inventory application (115) may be configured to execute on the mobile device (110). Specifically, the mobile inventory application (115) may be configured to display inventory information (122) in a graphical user interface of the mobile device (110). More specifically, in one or more embodiments of the invention, the mobile device (110) may include an inventory manager (120) with functionality to store and manage the inventory information (122). For example, the inventory manager (120) may store the inventory information (122) in a database, a text file, an in-memory data structure, or any other similar type of storage location. In one or more embodiments of the invention, the inventory information (122) may include one or more items (e.g., 130) that are being inventoried, and descriptive metadata associated with the item(s). Different types of descriptive metadata are described in detail above, and items (e.g., 130) are discussed in detail below.

Alternatively, in one or more embodiments of the invention, the mobile device (110) may be configured to communicate (e.g., via a cellular network, the Internet, or any other similar type of network) with a remote server (140) configured to store inventory information (145). In one or more embodiments of the invention, the remote server (140) may be a cellular service provider, an Internet server (e.g., a web server), or any other similar type of server. Further, in one or more embodiments of the invention, the mobile device (110) and remote server (140) may each include inventory information (e.g., 122, 145) and the inventory information (e.g., 122, 145) may be synchronized. For example, the inventory information (e.g., 122, 145) may be synchronized in a background process of the mobile device (110), in response to user input, in response to a synchronization signal sent by the remote server (140), or by any other similar method.

Further, in one or more embodiments of the invention, a wired computer system (150) (e.g., a desktop computer, workstation, plugged-in laptop, etc.) may be configured to communicate with the mobile device (110) and/or remote server (140). Specifically, the wired computer system (150) may include a wired inventory application (155) configured to display inventory information (162) on the wired computer system (150). More specifically, in one or more embodiments of the invention, the wired computer system (150) may include an inventory manager (160) with functionality to store and manage inventory information (162) to be displayed by the wired inventory application (155). Alternatively, in one or more embodiments of the invention, the wired inventory application (155) may be configured to display inventory information (145) stored on the remote server (140) and/or inventory information (122) obtained from the mobile device (110).

Further, in one or more embodiments of the invention, the wired computer system (150) and remote server (140) may each include inventory information (e.g., 162, 145), which may be synchronized. Moreover, if the wired computer system (150) and mobile device (110) each include inventory information (e.g., 162, 122), the wired computer system (150) and/or mobile device (110) may be configured to synchronize the inventory information (e.g., 162, 122). For example, the inventory information (e.g., 162, 122) may be synchronized by connecting the mobile device (110) to the wired computer system (150) and initializing synchronization software, via a wireless communications channel, or by any other similar method. Alternatively, the inventory information (e.g., 162, 122) may be synchronized via the remote server (140), e.g., by first synchronizing the wired computer system (150) with the remote server (140) and then synchronizing the remote server (140) with the mobile device (110), and/or vice versa.

In one or more embodiments of the invention, the inventory information (e.g., 122, 145, 162) may include information about physical items (e.g., 130). For example, the item (130) may be a retail product, a household item, a business asset, or any other similar type of item. In one or more embodiments of the invention, the item (130) may include a wireless transmitter (135) configured to transmit descriptive metadata associated with the item (130). For example, the wireless transmitter (135) may be a radio frequency identification (RFID) transmitter, an 802.11 wireless adapter, an infrared (IR) transmitter, or any other similar type of transmitter.

In one or more embodiments of the invention, the mobile inventory application (115) and/or wired inventory application (155) may be configured to obtain a wireless signal from the wireless transmitter (135) and add the item to the inventory information (e.g., 122, 145, 162) based on the wireless signal. Specifically, the mobile inventory application (115) and/or wired inventory application (155) may be configured to obtain the wireless signal via a wireless interface (e.g., RFID, 802.11, IR, etc.) of the mobile device (110) and/or wired computer system (150).

Further, in one or more embodiments of the invention, a point-of-sale device (105) may be configured to identify the item (130) and communicate descriptive metadata about the item (130) to the mobile device (110), remote server (140), and/or wired computer system (150). For example, the point-of-sale device (105) may be a check-out register, and may be configured to identify the item (130) using a laser scanner, a wireless signal (e.g., the types of signal discussed above), or by any other similar method. Those skilled in the art will appreciate that the interface of the point-of-sale device (105) used to identify the item (130) may be different from the interface used to communicate the descriptive metadata to the mobile device (110), remote server (140), and/or wired computer system (150). In one or more embodiments of the invention, the mobile device (110), remote server (140), and/or wired computer system (150) may be configured to use the descriptive metadata to update the inventory information (e.g., 122, 145, 162).

In one or more embodiments of the invention, the mobile inventory application (115) and/or wired inventory application (155) may be configured to access a peer-to-peer marketplace network (125). Specifically, in one or more embodiments of the invention, the peer-to-peer marketplace network (125) may be accessed via a web site, a stand-alone application (not shown) operating on the mobile device (110) or wired computer system (150), a module of the mobile inventory application (115) or wired inventory application (155), or any other similar type of interface. In one or more embodiments of the invention, the item (130) may be obtained via the peer-to-peer marketplace network (125), e.g., by purchasing the item (130), by trading for the item (130), or by any other similar method. Further, in one or more embodiments of the invention, the item (130) may be added as part of the inventory information (e.g., 122, 145, 162) based on obtaining the item via the peer-to-peer marketplace network (125).

Further, if the item (130) is already included as part of the inventory information (e.g., 122, 145, 162), the mobile inventory application (115) and/or wired inventory application (155) may be configured to advertise availability of the item (130) for sale and/or trade via the peer-to-peer marketplace network (125). Accordingly, if the item (130) is sold and/or traded via the peer-to-peer marketplace network (125), the item (130) may be removed from the inventory information (e.g., 122, 145, 162).

Those skilled in the art will appreciate that, in one or more embodiments of the invention, one or more of the elements discussed above (e.g., point-of-sale device, peer-to-peer marketplace network, remote server, wired computer system, etc.) may not be present. Further, in one or more embodiments of the invention, one or more specific components (e.g., inventory manager, inventory information, wireless transmitter, wired inventory application, etc.) of an element discussed above may not be present. Accordingly, those skilled in the art will appreciate that the diagram shown in FIG. 1 is provided for exemplary purposes only, and should not be construed as limiting the scope of the invention.

Figure 2:
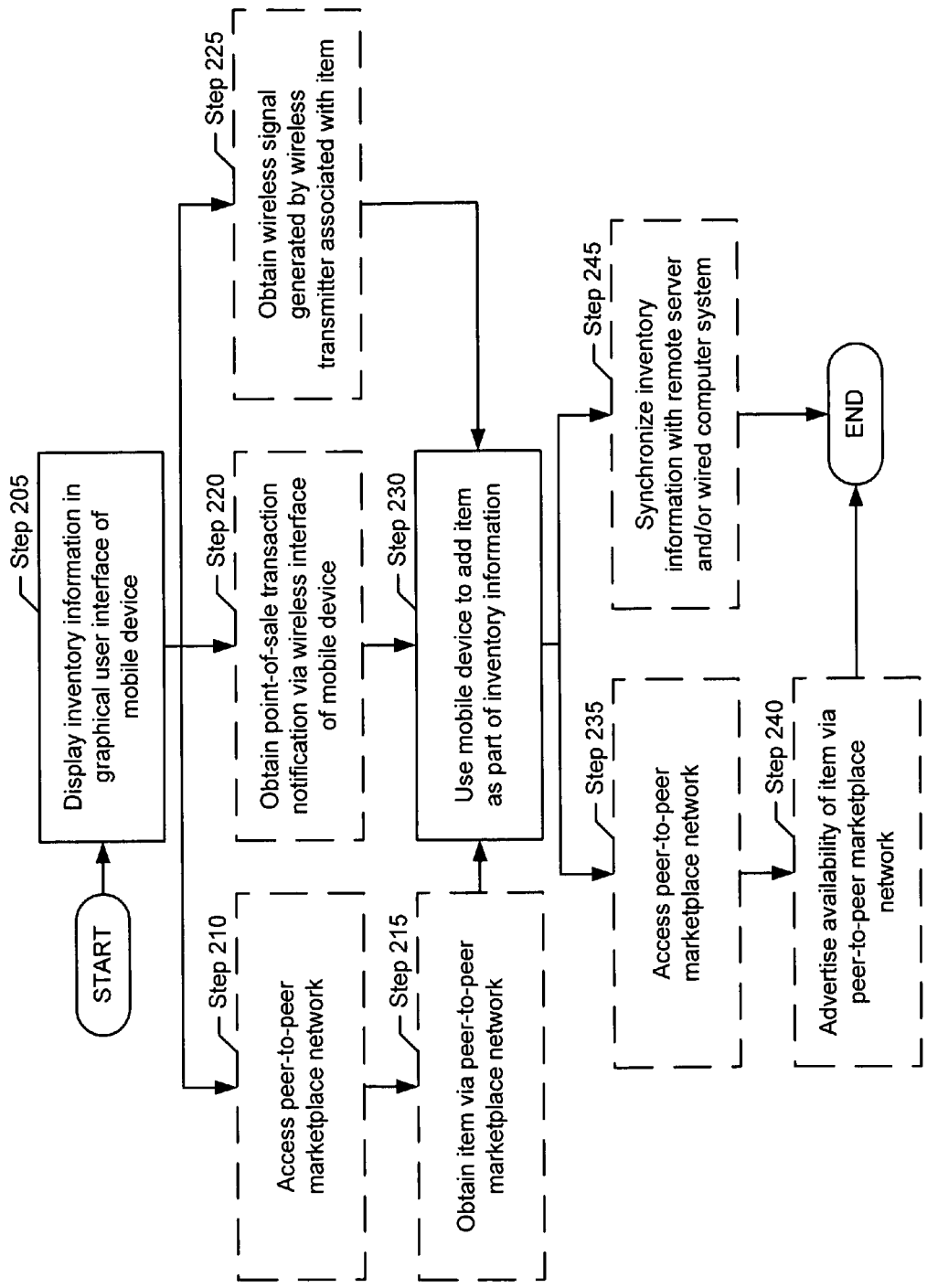
FIG. 2 shows a flowchart in accordance with one or more embodiments of the invention.

FIG. 2 shows a flowchart in accordance with one or more embodiments of the invention. Specifically, FIG. 2 shows a flowchart of a method for managing inventory information using a mobile device, in accordance with one or more embodiments of the invention.

In Step 205, inventory information is displayed in a graphical user interface of a mobile device. For example, the inventory information displayed may be warehouse inventory information, retail inventory information, household inventory information, or any other similar type of inventory information. Further, in one or more embodiments of the invention, the inventory information may be displayed in its entirety, one item at a time, in paginated format, in searchable format, or in any other similar type of visual arrangement. Moreover, in one or more embodiments of the invention, displaying the inventory information may involve accessing inventory information stored directly on the mobile device, inventory information stored on a remote server, or any combination thereof.

In one or more embodiments of the invention, using a mobile device to manage inventory information may facilitate access to the inventory information. Specifically, a user may be able to view and/or update the inventory information at any time and/or location that the mobile device is available. For example, the user may be able to view the mobile device while shopping, to determine whether a particular item is already included as part of the inventory information, or if the item needs to be purchased.

Continuing with discussion of FIG. 2, in one or more embodiments of the invention, the graphical user interface may include controls for manually adding items as part of the inventory information. Accordingly, in one or more embodiments of the invention, in Step 230, an item may be added as part of the inventory information by simply entering descriptive metadata about the item into the graphical user interface. Alternatively, descriptive metadata about the item may be obtained from an external source (i.e., external to the mobile device), such as a peer-to-peer marketplace network, a point-of-sale device, a wireless transmitter associated with the item, or any other similar type of external source. Different types of external sources are discussed in detail below. Further, in one or more embodiments of the invention, the item may be first added as part of the inventory information using a wired computer system, and the inventory information may subsequently be synchronized with the mobile device. Synchronizing inventory information is discussed in detail below.

In one or more embodiments of the invention, allowing entry of items as part of inventory information via a mobile device may allow for flexible inventory management. Specifically, because mobile devices are portable, a user may not be required to be at a specific physical location to enter an item as part of the inventory information.

Continuing with discussion of FIG. 2, in one or more embodiments of the invention, in Step 210, a peer-to-peer marketplace network may be accessed. For example, as discussed above, the peer-to-peer marketplace network may be accessed via a web page, a stand-alone application on the mobile device or a wired computer, or by any other similar method. Further, in one or more embodiments of the invention, the peer-to-peer marketplace network may be accessed using a cellular network, the Internet, an intranet, or any other similar type of network.

In one or more embodiments of the invention, in Step 215, an item may be obtained via the peer-to-peer marketplace network. For example, the item may be purchased, traded for another item, given freely, etc. In one or more embodiments of the invention, obtaining the item may signify that the item is to be shipped to a recipient. Accordingly, those skilled in the art will appreciate that obtaining the item may not indicate immediate physical possession of the item. Specifically, obtaining the item may involve obtaining descriptive metadata associated with the item.

In one or more embodiments of the invention, in Step 230, the item obtained via the peer-to-peer marketplace network may be added as part of the inventory information. Specifically, descriptive metadata associated with the item may be added to the inventory information, so that the inventory information reflects that the item has been obtained. In one or more embodiments of the invention, the item may be added automatically, i.e., via a programmatic link between the peer-to-peer marketplace network and an inventory manager, upon obtaining the item. Alternatively, adding the item may require some form of user input, e.g., selecting a control in the graphical user interface to initiate adding the item. Further, in one or more embodiments of the invention, the item may be added as part of inventory information stored directly on the mobile device, inventory information stored on a remote server, or both. Further, in one or more embodiments of the invention, the item may be first added as part of the inventory information stored on a wired computer system, and the inventory information may subsequently be synchronized with the mobile device. Synchronizing inventory information is discussed in detail below.

In one or more embodiments of the invention, linking a mobile inventory interface with a peer-to-peer marketplace network may facilitate management of the inventory information. Specifically, if obtaining an item via the peer-to-peer marketplace network results in an automatic update of the inventory information, a user may be relieved of the time burden of adding the item manually.

Continuing with discussion of FIG. 2, in one or more embodiments of the invention, the item may be obtained via a point-of-sale transaction, e.g., at a cash register, a vending machine, etc. Accordingly, in one or more embodiments of the invention, in Step 220, a point-of-sale transaction notification may be obtained via a wireless interface of the mobile device. For example, the point-of-sale transaction notification may be an infrared signal, a Bluetooth signal, an 802.11 communication, or any other similar type of notification. Further, in one or more embodiments of the invention, the point-of-sale transaction notification may include descriptive metadata associated with the item.

In one or more embodiments of the invention, the mobile device may be configured to obtain the point-of-sale transaction notification using an infrared interface, a Bluetooth interface, an 802.11 interface, or any other similar type of interface. Alternatively, the point-of-sale device may communicate the point-of-sale transaction notification directly to a remote server. In one or more embodiments of the invention, if the item is obtained via a point-of-sale transaction, then in Step 230, the item may be added as part of inventory information (i.e., inventory information stored in the mobile device and/or remote server) based on obtaining the point-of-sale transaction notification. Specifically, descriptive metadata included in the point-of-sale transaction notification may be used to update the inventory information.

In one or more embodiments of the invention, updating the inventory information using a point-of-sale transaction notification may allow for faster updating of the inventory information, e.g., by reducing the amount of manual entry required to add the item. Further, updating the inventory information automatically at the point of sale may increase the likelihood that the inventory information is kept up-to-date, i.e., that the inventory information accurately reflects items that have been purchased.

Continuing with discussion of FIG. 2, in one or more embodiments of the invention, the item may be associated with a wireless transmitter configured to transmit a wireless signal including descriptive metadata associated with the item. For example, a radio frequency identification (RFID) tag may be attached to the item and configured to transmit an RFID signal. Alternatively, in one or more embodiments of the invention, the wireless signal may be a Bluetooth signal, an 802.11 transmission, or any other similar type of signal. In one or more embodiments of the invention, in Step 225, the wireless signal may be obtained by the mobile device or a wired computer system. Further, in one or more embodiments of the invention, in Step 230, the item may subsequently be added as part of inventory information, based on obtaining the wireless signal. Specifically, in one or more embodiments of the invention, the descriptive metadata may be used to update inventory information stored directly on the mobile device, inventory information stored on a remote server, inventory information stored on a wired computer system, or any combination thereof. In one or more embodiments of the invention, if item is first added as part of inventory information stored on a wired computer system, the inventory information may subsequently be synchronized with the mobile device. Synchronizing inventory information is discussed in detail below.

In one or more embodiments of the invention, updating inventory information based on wireless signals, in the manner discussed above, may facilitate adding items as part of the inventory information. For example, if multiple items are each associated with wireless transmitters, the items may be quickly added based on their respective wireless signals, with minimal user input required.

As discussed above, descriptive metadata associated with an item may be obtained by different methods, e.g., via manual entry, a peer-to-peer marketplace network, a point-of-sale device, a wireless transmitter, etc. Those skilled in the art will appreciate that the descriptive metadata obtained using each of these methods may differ. Specifically, the descriptive metadata may differ depending on which method is used, the type of item, the type of mobile device, the type of remote server, the type of wired computer system, the type of communications protocol used, the type of point-of-sale device, a configuration of the peer-to-peer marketplace network, user-specified preferences, or any other similar factor.

Continuing with discussion of FIG. 2, in one or more embodiments of the invention, an item added as part of inventory information may subsequently be sold, traded, or given away. Specifically, in one or more embodiments of the invention, a peer-to-peer marketplace network may be accessed, as described above (Step 235), and availability of the item may be advertised via the peer-to-peer marketplace network (Step 240). More specifically, in one or more embodiments of the invention, advertising availability of the item may involve creating a marketplace listing, uploading an image of the item, adding a posting to an online message board, any other similar type of advertisement, or any combination thereof. In one or more embodiments of the invention, if the item is successfully sold, traded, or given away, inventory information associated with the item may be subsequently removed.

In one or more embodiments of the invention, using inventory information to advertise availability of an item on a peer-to-peer marketplace network may facilitate advertising of the item. Specifically, because the inventory information already includes descriptive metadata about the item, the amount of user input required to advertise the item may be reduced.

As discussed above, in one or more embodiments of the invention, inventory information stored on the mobile device, a remote server, and/or a wired computer system may be synchronized (Step 245). For example, synchronizing the inventory information may involve connecting (e.g., via a universal serial bus (USB) connection, via a serial port connection, via a wired or wireless connection, or any other similar type of connection) the mobile device to the wired computer system and initializing synchronization software. More specifically, synchronizing the inventory information may involve transferring descriptive metadata associated with items stored in the inventory information. Alternatively, the inventory information may be synchronized via the remote server, e.g., by first synchronizing the wired computer system with the remote server and then synchronizing the remote server with the mobile device, and/or vice versa.

In one or more embodiments of the invention, synchronizing inventory information between a mobile device, remote server, and/or wired computer system may increase the number of scenarios in which the inventory information may be used. For example, if the inventory information is stored on a remote server and accessible via a web page interface, a user may be able to access the inventory information anywhere a web browser is available, even if the mobile device and/or wired computer system are not available. By synchronizing the inventory information, one or more embodiments of the invention ensure that however the inventory information is accessed, the inventory information is up-to-date.

Those skilled in the art will appreciate that, in one or more embodiments of the invention, one or more of the steps discussed above may not be performed, or may be optional. Further, in one or more embodiments of the invention, one or more of the steps discussed above may be repeated. For example, more than one item may be obtained via a peer-to-peer marketplace network, prior to adding the information associated with the items. As another example, the inventory may be displayed after adding an item. Accordingly, those skilled in the art will appreciate that the specific ordering of the steps shown in FIG. 2 should not be construed as limiting the scope of the invention.

Figure 3:
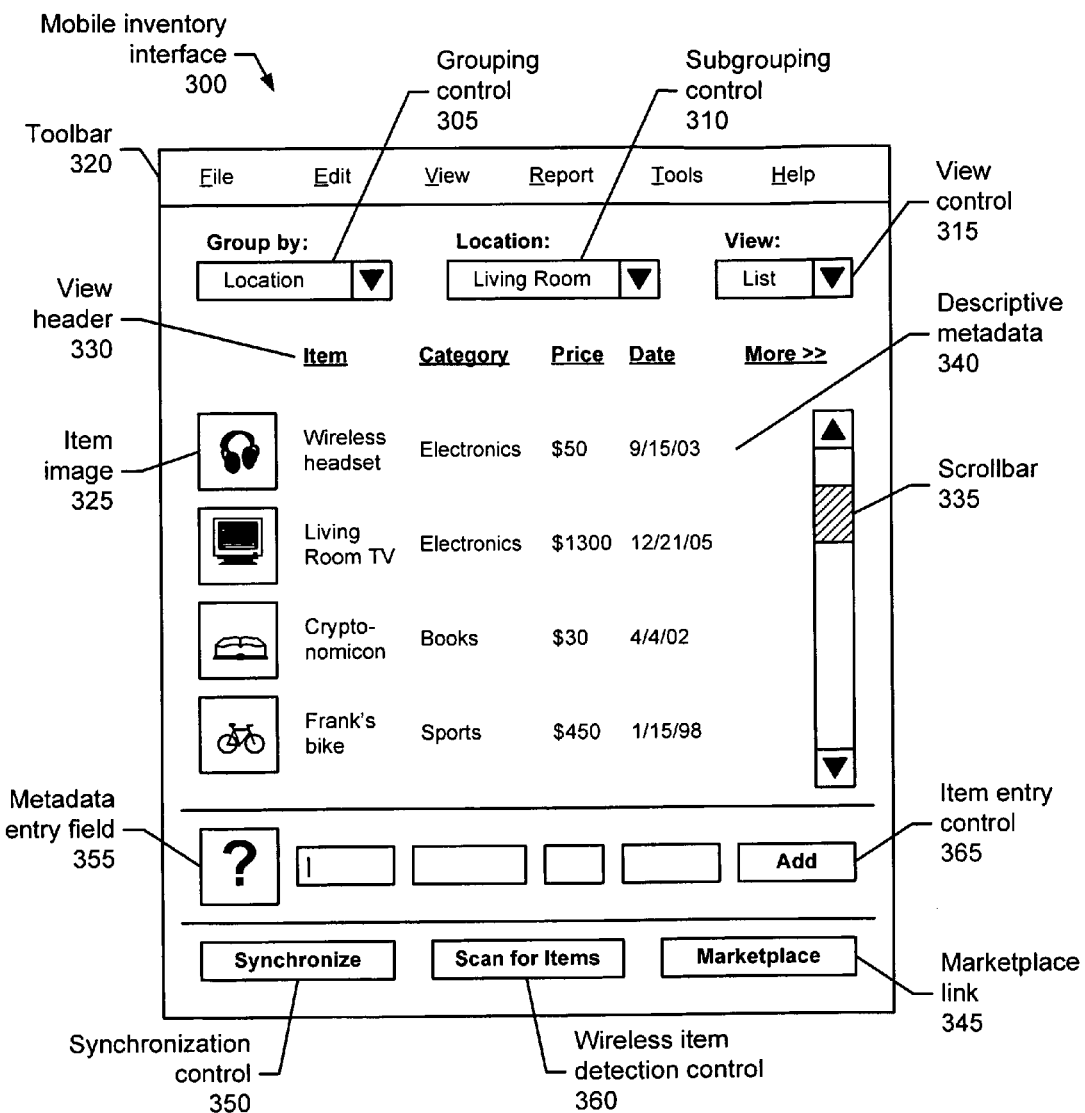
FIGS. 3-4 show a diagram of a graphical user interface in accordance with one or more embodiments of the invention.
Figure 4:
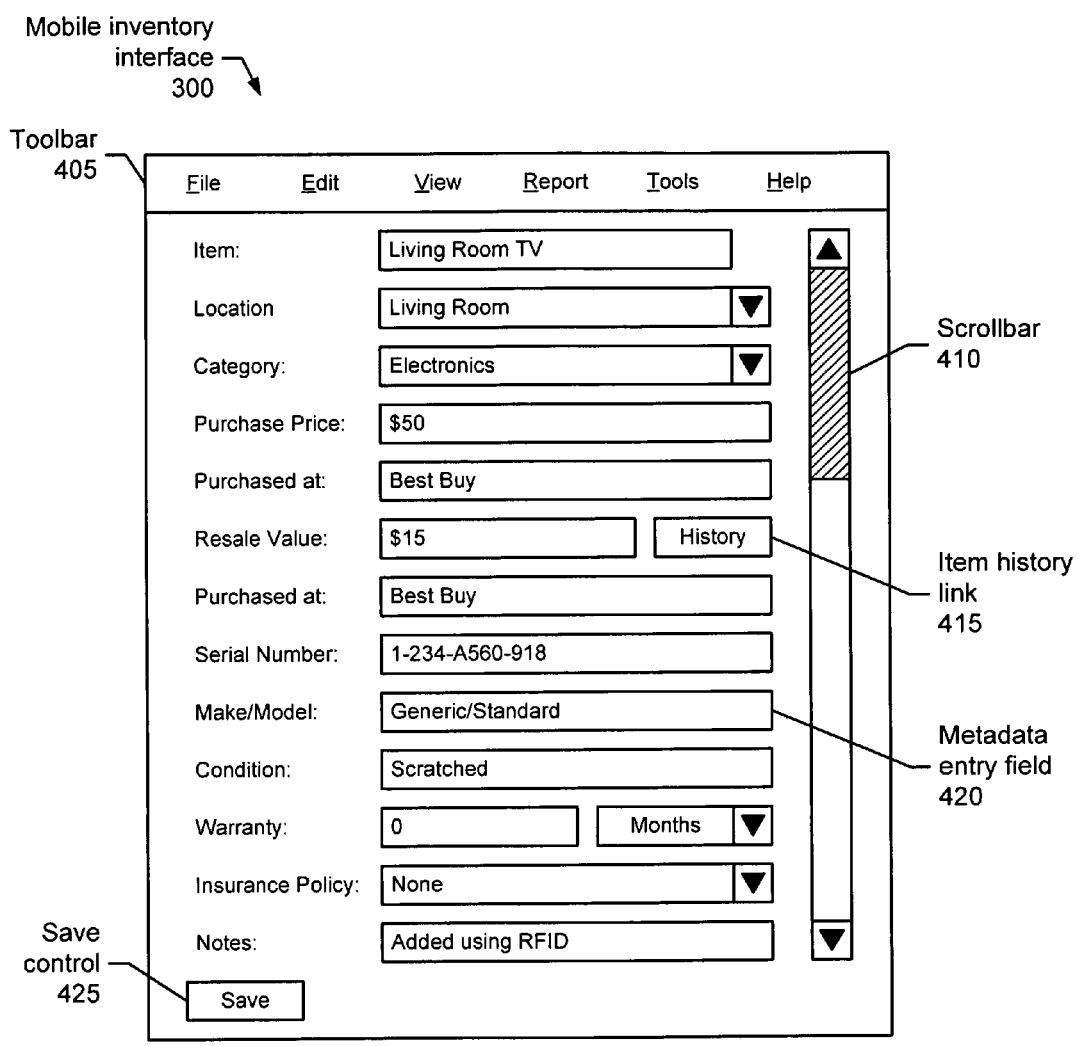

FIGS. 3-4 show a diagram of a graphical user interface in accordance with one or more embodiments of the invention. Specifically, FIGS. 3-4 show a diagram of a mobile inventory interface (300) for managing inventory information, in accordance with one or more embodiments of the invention. Those skilled in the art will appreciate that FIGS. 3-4 and related discussion below are provided for exemplary purposes only, and accordingly should not be construed as limiting the scope of the invention.

In one or more embodiments of the invention, the mobile inventory interface (300) may be configured to display descriptive metadata (e.g., 340) associated with items stored as part of inventory information. For example, as shown in FIG. 3, the descriptive metadata (e.g., 340) may include an item image (e.g., 325) associated with the item. Specifically, the item image (e.g., 325) may be a symbol, an icon, a photograph, or any other similar type of image. Different types of descriptive metadata are discussed above. In one or more embodiments of the invention, each type of descriptive metadata (e.g., 340) may be associated with a metadata header (e.g., 330) indicating which specific type of descriptive metadata (e.g., 340) is shown. Further, if the mobile inventory interface (300) is not large enough to display all of the descriptive metadata (e.g., 340) associated with each item, a special metadata header (e.g., 330) may be used to scroll through the different types of descriptive metadata (e.g., 340) available for display. In one or more embodiments of the invention, the special metadata header (e.g., 330) may be a scrollbar, a button, a hyperlink, or any other similar type of navigation control for displaying additional descriptive metadata (e.g., 340).

In one or more embodiments of the invention, the mobile inventory interface (300) may allow for entry of new items as part of the inventory information. For example, as shown in FIG. 3, the mobile inventory interface (300) may include one or more metadata entry fields (e.g., 355) configured to receive user input of descriptive metadata associated with an item. Specifically, the user input may involve textual input (e.g., using a keyboard, voice recognition, or any other similar type of text entry), audio input, video input, or any other similar type of input. Further, the mobile inventory interface (365) may include an item entry control (e.g., 365) configured to use the values entered in the metadata entry fields (e.g., 355) to add the described item as part of the inventory information.

In one or more embodiments of the invention, the descriptive metadata (e.g., 340) may be used to organize the display of the items. For example, a grouping control (e.g., 305) may be used to determine whether to group items by location, purchase location, category, cost, etc. Further, in one or more embodiments of the invention, a subgrouping control (e.g., 310) may be used to further filter the display of the items. For example, if the items are organized by location, the subgrouping control (e.g., 310) may be used to specify that only items located in a living room are to be displayed. Those skilled in the art will appreciate that many different combinations of grouping control(s) (e.g., 305) and/or subgrouping control(s) (e.g., 310) may be used.

In one or more embodiments of the invention, different views may be used to display the items. In other words, a user may be able to select a visual format for displaying the items. For example, the user may be able to choose to view the items as a list, to view only item images (e.g., 325) associated with the items, to view only a subset of the descriptive metadata (e.g., 340), etc. Accordingly, in one or more embodiments of the invention, the mobile inventory interface (300) may include a view control (e.g., 315) configured to obtain a user selection of a specific view to apply to the items. In one or more embodiments of the invention, the view control (e.g., 315) may be a dropdown menu, a radio button, a checkbox, or any other similar type of control.

In one or more embodiments of the invention, one or more items may not be immediately visible in the mobile inventory interface (300). Specifically, depending, for example, on the number of items, the item grouping and/or subgrouping selected, or any other similar factor, the mobile inventory interface (300) may not be large enough to display all of the items. Accordingly, in one or more embodiments of the invention, the mobile inventory interface (300) may include a scrollbar (e.g., 335) configured to scroll up and/or down to display additional items. Alternatively, in one or more embodiments of the invention, arrow buttons, hyperlinks, or any other similar type of navigation control may be used to display additional items.

In one or more embodiments of the invention, the mobile inventory interface (300) may include controls for accessing advanced inventory management features. For example, the mobile inventory interface (300) may include a synchronization control (e.g., 350) configured to initialize synchronization of the inventory information with other inventory information, e.g., inventory information on a remote server and/or wired computer system. Synchronization of inventory information is discussed in detail above.

Further, in one or more embodiments of the invention, the mobile inventory interface (300) may include a wireless item detection control (e.g., 360) configured to use a wireless interface (not shown) of the mobile device to locate items in physical proximity to the mobile device. Specifically, the wireless item detection control (e.g., 360) may cause the mobile device to obtain a wireless signal from a wireless transmitter associated with an item. Obtaining wireless signals from wireless transmitters associated with items is discussed in detail above. Alternatively, the mobile device may be configured to obtain wireless signals automatically, and display a prompt (not shown) on detection of an item that can be added as part of the inventory information.

Further, in one or more embodiments of the invention, the mobile inventory interface (300) may include a marketplace link (e.g., 345) configured to initialize access to a peer-to-peer marketplace network (not shown), which may then be used to obtain an item and/or advertise availability of an item stored as part of the inventory information. Different uses of the peer-to-peer marketplace network are discussed in detail above.

In one or more embodiments of the invention, the mobile inventory interface (300) may include a toolbar (e.g., 320) providing access to various functionality of the mobile inventory interface (300). For example, the toolbar (e.g., 320) may provide access to one or more of the functional aspects discussed above (e.g., grouping, subgrouping, item entry, synchronization, wireless item detection, accessing a peer-to-peer marketplace network, etc.). Further, the toolbar (e.g., 320) may provide access to other functionality. For example, the toolbar (e.g., 320) may include an option to edit an item, view detailed information about an item, generate an inventory report, or any other similar type of functionality.

In one or more embodiments of the invention, to add and/or edit an item, the mobile inventory interface (300) may display a detailed view for entering and/or editing descriptive metadata associated with the item. Specifically, as shown in FIG. 4, the detailed view may include multiple metadata entry fields (e.g., 420) and a save control (e.g., 425) for saving the entered descriptive metadata. Further, in one or more embodiments of the invention, the detailed view may include a toolbar (e.g., 405) providing access to functionality of the mobile inventory interface (300). Those skilled in the art will appreciate that the toolbar (e.g., 405) may provide the same functionality as the toolbar (e.g., 320) discussed with respect to FIG. 3, a subset of that functionality, or completely different functionality. In other words, the specific functionality available in the toolbar(s) (e.g., 320, 405) may vary depending on the functional context of the mobile inventory interface (300).

Further, in one or more embodiments of the invention, if the mobile inventory interface (300) is not large enough to fully display the detailed view, a scrollbar (e.g. 410) or other similar control may be used to provide access to additional descriptive metadata. Moreover, in one or more embodiments of the invention, the mobile inventory interface (300) may include one or more controls for viewing detailed information associated with a metadata entry field (e.g., 420). For example, if a resale value field is used, an item history link (415) may be configured to initialize a history screen (not shown) including information about the item that may influence the item's resale value. Those skilled in the art will appreciate that many different types of detailed information may be associated with metadata entry fields (e.g., 420).

In one or more embodiments of the invention, one or more of the elements discussed above with respect to FIGS. 3-4 (e.g., toolbar, grouping control, subgrouping control, metadata header, descriptive metadata, metadata entry field, scrollbar, synchronization control, wireless item detection control, marketplace link, etc.) may not be present. Further, in one or more embodiments of the invention, the specific ordering and/or visual characteristics of elements may differ from those shown in FIGS. 3-4. Accordingly, those skilled in the art will appreciate that the graphical user interface shown in FIGS. 3-4 is provided for exemplary purposes only, and should not be construed as limiting the scope of the invention.

In one or more embodiments of the invention, functional aspects of the graphical user interface described in relation to FIGS. 3-4 provide a straightforward, accessible means for managing inventory information using a mobile device. Specifically, the inventory information may be managed with minimal user input, may be customized according to a user's preferences, and specific descriptive metadata associated with items may be readily available for viewing and/or editing.

Figure 5:
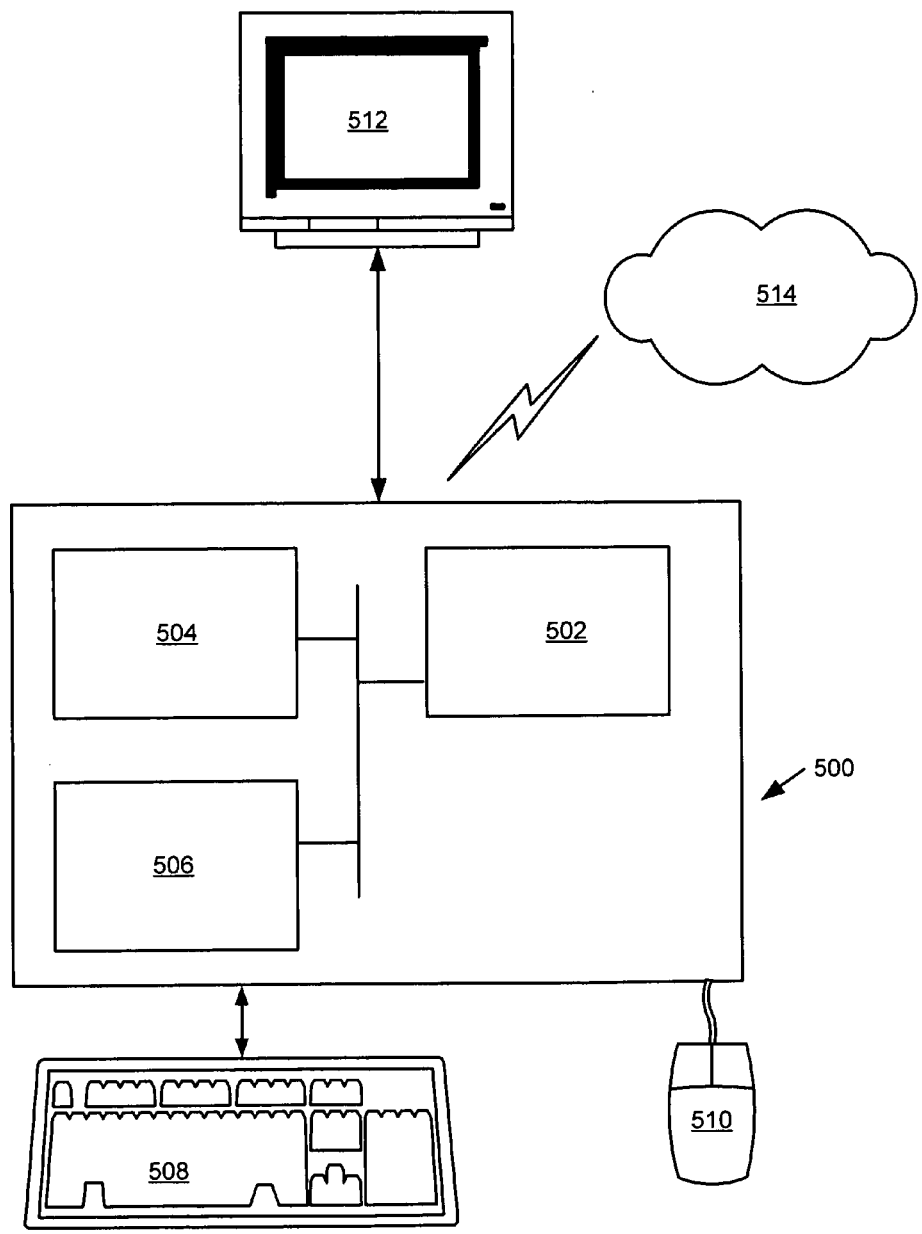
FIG. 5 shows a diagram of a computer system in accordance with one embodiment of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512).

The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., point-of-sale device, mobile device, mobile inventory application, inventory manager, inventory information, peer-to-peer marketplace network, item, wireless transmitter, remote server, wired computer system, wired inventory application, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing inventory information, comprising:
   obtaining, from a peer-to-peer marketplace network, at least one item from a group consisting of traded items and items obtained for free;
   obtaining descriptive metadata about the at least one item;
   automatically updating, with the descriptive metadata about the at least one item, via a programmatic link of the peer-to-peer marketplace network, inventory information of inventory items owned by a household;
   receiving a command, in response to updating the inventory information and in a graphical user interface of a mobile device from a user of the mobile device, to display the inventory information to determine whether to purchase a particular item;
   displaying the inventory information in the graphical user interface of the mobile device responsive to receiving the command;
   in response to receiving the command and displaying the inventory information resulting in a determination to purchase the particular item, obtaining a point-of-sale transaction notification via a wireless interface of the mobile device from a point-of-sale register, wherein the point-of-sale transaction notification relates to a transaction already completed by the point-of-sale register with respect to purchasing the particular item by the user of the mobile device, wherein the point-of-sale transaction notification comprises descriptive metadata about the particular item;
   adding the particular item as part of the inventory information, using the mobile device, wherein adding the particular item comprises adding the descriptive metadata about the particular item to the inventory information based on the point-of-sale transaction notification; and
   removing a portion of the inventory information for inventory items that are no longer owned by the household.

2. The method of claim 1, further comprising:
   synchronizing the inventory information with a wired inventory application,
   wherein the wired inventory application is configured to execute on a wired computer system.

3. The method of claim 1, wherein the inventory information is stored in a remote server.

4. A system comprising:
   a mobile device, configured to:
      obtain, from a peer-to-peer marketplace network, at least one item from a group consisting of traded items and items obtained for free;
      obtain descriptive metadata about the at least one item;
      automatically update, with the descriptive metadata about the at least one item, via a programmatic link of the peer-to-peer marketplace network, inventory information of inventory items owned by a household;
      receive a command, in response to updating the inventory information and in a graphical user interface of the mobile device from a user of the mobile device, to display the inventory information to determine whether to purchase a particular item;
      display the inventory information in the graphical user interface of the mobile device responsive to receiving the command;
      in response to receiving the command and displaying the inventory information resulting in a determination to purchase the particular item, obtain a point-of-sale transaction notification via a wireless interface of the mobile device from a point-of-sale register, the point-of-sale transaction notification relating to a transaction already completed by the point-of-sale register with respect to purchasing the particular item by the user of the mobile device, wherein the point-of-sale transaction notification comprises descriptive metadata about the particular item;
      add the particular item as part of inventory information, wherein adding the particular item comprises adding the descriptive metadata about the particular item to the inventory information based on the point-of-sale transaction notification; and
      remove a portion of the inventory information for inventory items that are no longer owned by the household.

5. The system of claim 4, further comprising:
   a wired computer system,
      configured to execute a wired inventory application,
      wherein the mobile device is further configured to:
         synchronize the inventory information with the wired inventory application.

6. The system of claim 4, further comprising: a remote server configured to store the inventory information.

7. A non-transitory computer readable storage medium comprising instructions, which when executed, cause the computer to perform a method for managing inventory information, the method comprising:
   obtaining, from a peer-to-peer marketplace network, at least one item from a group consisting of traded items and items obtained for free;
   obtaining descriptive metadata about the at least one item;
   automatically updating, with the descriptive metadata about the at least one item, via a programmatic link of the peer-to-peer marketplace network, inventory information of inventory items owned by a household;

receiving a command, in response to updating the inventory information and in a graphical user interface of a mobile device from a user of the mobile device, to display the inventory information to determine whether to purchase a particular item;

displaying the inventory information in the graphical user interface of the mobile device responsive to receiving the command;

in response to receiving the command and displaying the inventory information resulting in a determination to purchase the particular item, obtaining a point-of-sale transaction notification via a wireless interface of the mobile device from a point-of-sale register, wherein the point-of-sale transaction notification relates to a transaction already completed by the point-of-sale register with respect to purchasing the particular item by the user of the mobile device, wherein the point-of-sale transaction notification comprises descriptive metadata about the particular item;

adding the particular item as part of the inventory information, using the mobile device, wherein adding the particular item comprises adding the descriptive metadata about the particular item to the inventory information based on the point-of-sale transaction notification; and removing a portion of the inventory information for inventory items that are no longer owned by the household.

8. The non-transitory computer readable storage medium of claim 7, the method further comprising:

synchronizing the inventory information with a wired inventory application, wherein the wired inventory application is configured to execute on a wired computer system.

9. The non-transitory computer readable storage medium of claim 7, wherein the inventory information is stored in a remote server.

* * * * *